United States Patent [19]

Johnson et al.

[11] Patent Number: 5,602,197

[45] Date of Patent: *Feb. 11, 1997

[54] REVERSIBLE POLYMER GEL BINDERS FOR POWDER FORMING

[75] Inventors: Ronald E. Johnson, Tioga, Pa.; Jean M. News, Wilmington, Del.

[73] Assignee: Corning Incorporated, Corning, N.Y.

[*] Notice: The portion of the term of this patent subsequent to Jun. 18, 2008, has been disclaimed.

[21] Appl. No.: 981,262

[22] Filed: Nov. 25, 1992

Related U.S. Application Data

[63] Continuation-in-part of Ser. No. 785,984, Oct. 31, 1991, abandoned, which is a continuation of Ser. No. 358,571, May 30, 1989, abandoned.

[51] Int. Cl.$^6$ ........................................................ C08L 91/06
[52] U.S. Cl. ........................... 524/275; 264/63; 264/344; 419/36; 419/37; 524/404; 524/413; 524/424; 524/428; 524/439; 524/440; 524/441
[58] Field of Search ...................... 264/63, 344; 524/487, 524/275, 404, 413, 424, 428, 439, 440, 441; 419/36, 37

[56] References Cited

U.S. PATENT DOCUMENTS

| | | |
|---|---|---|
| 4,158,688 | 6/1979 | Pett et al. . |
| 4,158,689 | 6/1979 | Pett et al. . |
| 4,201,594 | 5/1980 | Walters et al. . |
| 4,401,782 | 8/1983 | Conklin ................................. 524/275 |
| 4,404,166 | 9/1983 | Minjolle et al. . |
| 4,472,537 | 9/1984 | Johnson ................................. 524/274 |
| 4,568,502 | 2/1986 | Theodore et al. . |
| 4,895,567 | 1/1990 | Colon ................................... 524/275 |
| 5,024,978 | 6/1991 | Allaire .................................... 501/95 |

FOREIGN PATENT DOCUMENTS 0074274  3/1983  European Pat. Off. .

OTHER PUBLICATIONS

Chemical Abstracts vol. 107, No. 26 (Dec. 1987) p. 298, Abs#241464n, Columbus, OH, [JP 62–197166 published 31 Aug. 1987].

*Primary Examiner*—James Derrington
*Attorney, Agent, or Firm*—Kees van der Sterre

[57] ABSTRACT

Thermoplastic binder compositions comprising a high molecular weight polymer component and a molten wax component are compounded with sinterable ceramic or other inorganic powders. Upon cooling, a thermally reversible gel is formed in the binder by the gelation of the polymer in the molten wax. Ceramic batches comprising these binders behave as shear-thinning and thermally reversible gels. They exhibit substantially improved dewaxing performance and, preferably, extensibility sufficient for sheet reforming processes.

16 Claims, No Drawings

REVERSIBLE POLYMER GEL BINDERS FOR POWDER FORMING

This application is a continuation-in-part of prior application Ser. No. 07/785,984, filed Oct. 31, 1991, now abandoned which was a continuation of application Ser. No. 07/358,571, filed May 30, 1989 and now abandoned.

BACKGROUND OF THE INVENTION

The present invention relates to the manufacture of articles from sinterable powders by forming processes such as injection molding, extrusion, or the like. More particularly, the invention relates to thermoplastic binder formulations for the manufacture of ceramic or other inorganic products, which binders exhibit reversible gelling behavior in combination with desirable binder burnout characteristics.

Binders useful for the manufacture of products from powdered starting materials, e.g., from particulate ceramic materials, must meet a number of requirements. For example, the binder must be compatible with the ceramic material such that a flowable dispersion comprising a relatively high loading of the ceramic material in the binder may be provided. In addition, the "green" preform produced by shaping the dispersion of ceramic powder in the binder should have reasonable strength such that it can be handled.

For desirable binder "burnout" or dewaxing performance, the binder should be removable from the shaped ceramic part without incurring distortion or breakage of the part. And, the binder-free preform should have at least a minimum level of strength, yet be sufficiently free of binder residues that defect-free consolidation is readily achievable.

The formulation of binders meeting these requirements is complex and a large number of different binder formulations have been proposed in the prior art. U.S. Pat. No. 4,201,594, for example, discloses binders of liquid type which are useful to make slurries of ceramic powders which will gel in a forming mold. The gels thus provided are irreversible, and are intended to improve shape retention in the formed part.

Thermoplastic or heat-softening binder compositions comprising combinations of thermoplastic polymer and oil or wax additives are also known, these compositions taking the form of meltable solids. U.S. Pat. No. 4,568,502 discloses binder formulations of this type, the disclosed compositions consisting of mixtures of thermoplastic block copolymers, oils, waxes, and a stiffening polymer component which enhances the rigidity of green ceramic preforms containing the binder.

U.S. Pat. No. 4,404,166 discloses a binder system comprising two wax components, each component exhibiting a different melting or vaporization behavior. Advantageously, the lower melting point wax can be volatilized from a green ceramic preform comprising the binder while the higher melting point component remains in place to support the preform and help to prevent distortion or sagging thereof.

U.S. Pat. Nos. 4,158,688 and 4,158,689 describe binder formulations comprising block copolymers of specified composition as the principal binder components and added oils and/or waxes to serve as plasticizers. The block copolymers may comprise elastomeric materials, i.e., synthetic rubber components, but the plasticizing oil and wax additives are identified as naphthenic, paraffinic or mixed naphthenic/paraffinic oils or waxes.

While the above and other prior art patents show significant advances in the capability of the art to form complex ceramic products by casting, molding, extrusion or other forming processes, further improvements in this capability are always desirable.

Particularly advantageous would be a binder formulation imparting the characteristic of extensibility to the compounded batch material, i.e., the capability of being extended or stretched without fractural failure of the plastic material. Forming processes requiring extensibility of the batch material during forming are known, but such processes have not been traditionally used for forming ceramic compositions because the required properties were felt to be unattainable with the highly filled compositions generally employed.

Also desirable would be binder compositions exhibiting improved dewaxing or debindering behavior, such that the removal of waxes or other binder constituents from the shaped part could be carried out rapidly without risk of slumping or cracking of the formed part. Particular advantages are realized if lower melt viscosities and lower dewaxing temperatures can be employed.

It is therefore a principal object of the present invention to provide novel binder formulations for powder forming processes and particularly for the manufacture of ceramic parts or products from powdered ceramic materials.

It is a further object of the invention to provide novel thermoplastic binder formulations which can be used to formulate ceramic batches exhibiting sufficient extensibility, at semi-molten binder temperatures, to be compatible with thermo-forming, blow molding and other plastic forming processes.

It is a further object of the invention to provide thermoplastic binder formulations for powder forming which impart sufficient extensibility to the batch to permit cross-sectional area reductions by drawdown of the shaped batch, as for example by draw-down of the extrudate in an extrusion process.

It is a further object of the invention to provide novel thermoplastic binder formulations which can be used to make powder batches comprising sinterable inorganic powders and offering a rapid transition on cooling to a tack-free state, even while retaining molten wax constituents therein.

It is a further object of the invention to provide novel thermoplastic binder formulations which provide green ceramic or other powder-formed parts offering improved dewaxing behavior with reduced part distortion or slumping.

It is a further object of the invention to provide novel ceramic or other powder batches of high solids content and improved methods for compounding them.

It is a further object of the invention to provide novel ceramic batches for the manufacture of ceramic parts or products, which batches exhibit improved batch flow and dewaxing behavior.

Other objects and advantages of the invention will become apparent from the following description thereof.

SUMMARY OF THE INVENTION

The above and other objects of the invention are attained through the use of a new thermoplastic organic binder composition exhibiting, and imparting to a ceramic or other powder batch the characteristic of reversible gelling behavior.

The essential components of the thermoplastic organic binder compositions of the invention include a wax component, serving as a solvent or matrix phase in the binder, and an organic polymer serving as a gel-forming species in the binder. These components are chemically and physically compatible, forming a homogeneous wax/polymer melt wherein the polymer is dissolved or dispersed in the molten wax. However, upon cooling from the melt, reversible gel linkages are formed between the extended polymer chains in the liquid wax such that the binder exhibits the behavior of a cross-linked gel.

More specifically characterizing the behavior of the inventive binders, as the temperature of the binder decreases from the binder melt temperature, a temperature called the upper gel formation temperature is reached at which linkages between the polymer molecules begin to form. As the temperature continues to decrease, additional linkages form and the effective molecular weight of the polymer increases towards infinity. Finally, as the temperature continues to decrease, the wax solidification temperature is reached and the binder and batch comprising it become solid.

In upper portion of the temperature range between the upper gel formation temperature and the wax solidification temperature, the binder and the powder batch comprising it can exhibit considerable extensional flow characteristics. In fact, for some highly flexible backbone polymers, the ceramic batch remains flexible even after the gel is completely formed as a 3-dimensional network, although in this region batch extensibility is often much reduced.

The gel which forms in these binders during the cooling process is reversible by the application of heat, such heat being effective to break down the gel linkages formed in the binder on cooling. Also, depending on the particular polymers and waxes employed, the application of shear to the binder or batch can also promote the breaking down of the gel structure.

In the process of reheating, the melting of the wax matrix will precede the breakdown temperature of the polymer gel, i.e., the gel breakdown temperature will exceed the wax melting temperature. In fact, in some systems, the gel breakdown temperature on heating can significantly exceed the gel formation temperature on cooling. High gel breakdown temperatures are a significant benefit in these binder systems, in that formed parts comprising the binders exhibit strong shape retention even at temperatures well above the melting and volatilization temperatures of the low-melting waxes. Thus the waxes are more readily removed from ceramic parts by fast dewaxing procedures, while the gels impart high resistance to part cracking, slumping or distortion during the early stages of binder burnout.

Although the binders of the invention offer substantial advantages in conventional forming processes such as molding and extrusion, their most unique processing advantage is that of imparting extensional flow characteristics to powder batches. Particularly evident in the processing of ceramic powder batch materials, these extensional flow characteristics permit the use of sheet reforming processes such as vacuum or pressure thermoforming, blow molding, and other techniques which have previously been used for glass and plastic forming but rarely if ever for ceramic or other powder forming processes.

Further, even in conventional ceramic forming processes such as extrusion, the unique extensional flow characteristics imparted by the binder systems of the invention enable the batch material to perform in ways not attainable with conventional batch formulations. For example, extrudate diameter reductions of 20 to 1 have been obtained by direct draw-down of extruded batches comprising the binders of the invention, with full retention of complex structural features of the original extrudate.

In all of the aforementioned processes, whether requiring extensional flow or otherwise, the binders of the present invention offer novel and important performance advantages including, but not being limited to: rapid transition from relatively low melt viscosity to a high-viscosity, tack-free state on cooling; good flexibility below the binder solidification or "set" temperature; rapid dewaxing at low temperatures without slump; and the ability to achieve high ceramic powder loadings (typically 50–75% by volume) while still exhibiting good processing characteristics.

High powder loadings are achieved in accordance with the invention through the use of an improved process for compounding thermoplastic powder batches comprising thermoplastic binders. In accordance with that method, the selected sinterable ceramic or other inorganic powder is first combined with a powder dispersant and a solvent for the dispersant to provide a powder slurry. In a separate container and separate mixing step, the thermoplastic polymer selected for incorporation in the binder is combined with a selected low-melting wax component at a temperature above the melting temperature of the wax, in order to provide a wax/polymer mixture comprising a uniform solution or dispersion of the polymer in the molten wax.

The powder slurry is next combined with the wax/polymer mixture and the combination is mixed together at a temperature above the melting temperature of the wax. Mixing is continued for a time at least sufficient to provide a homogeneous dispersion of the powder in the binder mixture, and will be sufficient to evaporate as much as possible the solvent component from the slurry. We have found that, through the incorporation of the powder component as a slurry rather than as a dry mill addition, higher loadings of the powder in the binder can be achieved.

DETAILED DESCRIPTION

The present invention is not restricted to ceramic batch formulations but has general application to powder forming processes, i.e., to the forming of products or preforms for products from essentially any particulate sinterable inorganic material which is available in or convertible to a finely divided form. Examples of powder formed materials known to the art are particulate ceramics, including crystalline ceramic materials, glasses in particulate form, and crystallizable glasses (glass-ceramics), as well as powdered metals and sinterable non-oxide materials such as inorganic nitrides, carbides, and borides. Thus while the following description principally describes the processing of glass and ceramic batches comprising the thermoplastic gel binders of the invention, such descriptions are illustrative only and the invention is not deemed to be limited thereto.

As previously disclosed, the capability of exhibiting the properties of a reversible gel is a critical feature of the thermoplastic binders of the present invention. Polymer gels have been characterized as three-dimensional networks of flexible chains cross-linked by chemical or physical bonds. Such gels are generally classified into two types: reversible gels and irreversible gels.

In irreversible gels the polymer networks are formed by reacting one or more polymeric species in a non-reacting dispersing medium to provide covalent bonding among polymer species. The cross-links thus formed are not readily broken and reformed; therefore the gel is considered irreversible.

In reversible gels, on the other hand, cross-links are formed which can be easily reversed through physical means such as shearing or heat. The cross-links can be entwined helical chains, microcrystallites, or associations of segments of one copolymer chain with the segments of another chain. Such associations can occur either through hydrogen bonding between polar groups or through the association of similar block segments from each chain due to the thermodynamic incompatibility of the different block segment types in each chain. In the latter case, although the polymer may be miscible or soluble in the molten binder mixture, portions of the polymer chain may become poorly dissolved in the melt as the temperature declines. However, because these portions show good solubility for one another, they can associate into regions which form thermally reversible cross-links and a gel structure. Polymer-wax systems of this type are known which exhibit excellent gelling behavior and binder performance in accordance with the invention, as hereinafter more fully described.

The unique reversible gelling properties of the binders of the invention require that both the polymer components and the wax components be carefully selected. The polymer component must comprise a polymer which is soluble in or miscible with the selected molten wax, and which upon cooling of the polymer-wax mixture will form a reversible gel structure therein at a temperature above the solidification temperature of the wax. The wax, on the other hand, must provide a good solvent or compatible vehicle for the polymer and should exhibit melting and significant volatilization at some temperature which is below the gel breakdown temperature of the binder.

The gel breakdown temperature of the binder is that temperature at which, upon heating, the cross-linked gel structure is disrupted and the binder becomes a flowable liquid. The gel breakdown temperature of any particular binder formulation is manifested by the onset of viscous flow in the binder upon heating, and can be measured by standard methods such as the ring-and-ball softening point test (ASTM Test Designation E28-67).

An important characteristic of some reversible gel binders is that of being shear inhibited. A shear inhibited gel or batch retains a relatively high level of fluidity while in shear, and this characteristic can accordingly facilitate ceramic part forming in processes involving batch shear and requiring fluid batch formulations. Further, after part forming is complete and shear terminates, the shear inhibited binder can rapidly gel and become semisolid. Thus it quickly provides support for the formed part at the conclusion of the forming operation.

Gel binders exhibiting gelling temperatures on cooling which are relatively low compared to their gel breakdown temperatures on heating offer a further processing advantage. After heating and/or shearing of the batch to achieve gel breakdown in preparation for forming, the batch can be formed at relatively low temperatures without risk of regelling during the forming operation. Further, once the formed part has cooled and regelled, temperatures significantly higher than the part forming temperature can be used without part distortion, and thus higher dewaxing temperatures can be used earlier in the dewaxing cycle than would otherwise be possible.

The advantageous debindering behavior of powder batches comprising these thermoplastic gel binders is due in part to the high mobility of the molten low-melting waxes therein, such that wax diffusion and vaporization appear to be unaffected by the presence of the residual polymer gel network. In addition, the strength provided by the three-dimensional gel structure in a shaped green body minimizes the formation of stress cracks and other defects during dewaxing, and improves the resistance of the part to flow or slumping during the dewaxing cycle.

Finally, as previously suggested, certain of the reversible gel binders of the invention provide ceramic batches which exhibit excellent extensional flow characteristics in the gelled state at temperatures below the original batch processing temperature but above the wax melting temperature. Ceramic batches exhibit this characteristic of extensibility can be initially formed e.g., into green sheet at high temperatures and then cooled. Thereafter, the sheet can be reheated to a working temperature in the gel or so-called "reforming" range and reshaped by the application of pressure into any of a wide variety of preform shapes.

The reforming range is defined for the present purpose as that range of temperatures above the wax melting temperature but below the temperature of complete gel breakdown in the material. At these temperatures, due to the surprising extensibility of the reheated batch material, reforming can be carried out utilizing processes requiring a high degree of extensional flow, such as vacuum forming, blow molding or the like, which have had no practical application to ceramic forming in the prior art. The amount of extensional flow exhibited by any particular batch will depend not only upon the binder composition, but also upon the composition of the powder present in the batch.

In some batches incorporating the binder systems of the invention, behavior approaching elastic recovery or shape relaxation in reformed products has been observed. While useful for some applications, any undesired shape relaxation in the shaped batch material can readily be avoided simply by cooling formed shapes against their shaping surfaces to a temperature below the crystallization temperature of the wax. Following such cooling, later elastic recovery causing shape relaxation, for example as the reformed part is later heated for dewaxing, has not proven to be a problem.

Advantageously, the binders of the invention can be used in ceramic batches wherein the loading of ceramic powder material is relatively high. Batches wherein the binder constitutes as little as 25–30% by volume of the total batch can be used for processes such as extrusion or injection molding, although binder concentrations of 30–40% by volume will be more typical for most powder forming applications. Of course, where particular advantage of the desirable extensional or melt-flow characteristics of the binder is to be taken, binder loadings-of 60% by volume or more may be employed.

As previously noted, the composition of the binder must be carefully controlled if desirable gelling characteristics are to be developed in the ceramic batch. Preferred binder systems operable in the present invention are formulations consisting essentially, in weight percent, of about 30–80% of at least one low-melting volatile wax, e.g., a fatty alcohol wax, 1–40% of at least one high molecular weight organic polymer, 0–20% total of modifying waxes, such as Carnauba wax, and 0–15% total of dispersants, lubricants, release agents and other functional additives having known utility in ceramic batches for molding or extrusion.

Referring in more detail to the above binder components, the low melting point, volatile waxes are generally characterizable as fatty alcohol, fatty acid, fatty glycol, and fatty glyceride waxes, i.e., waxes comprising these compounds or esters thereof, which are crystalline solids at room temperature and have melting points not exceeding about 80° C. Low molecular weight paraffinic waxes may also be used, although they exhibit somewhat lower volatility than the non-paraffinic waxes mentioned.

The preferred waxes, which principally comprise wax molecules of 14–20 carbon atoms and most preferably consist of 14–18 carbon fatty alcohol waxes, exhibit relatively rapid volatilization at temperatures above about 140° C. at standard pressure and even more rapid volatilization under vacuum. Although other crystalline, low melting organic materials of high volatility could function as solvents in these systems, they generally do not have the requisite low toxicity and gel compatibility for use as a stable binder material for the compounding and molding of ceramic batches in accordance with the invention.

The high molecular weight polymer component imparting gelling properties to the binder may be essentially any wax-soluble or wax-miscible polymer which will form a gel in the selected low-melting wax. Polymers from a wide variety of different polymer systems have been shown to be compatible with molten waxes and to provide good gelling properties in wax solution. Representative of such diverse polymers are crystalline polymers such as ultrahigh molecular weight polyethylene (UHMWPE), polyethylene/acrylic acid copolymers, butyl methacrylate/acrylic acid copolymers, and thermoplastic block copolymer elastomers such as styrene tri-block copolymers.

The selection of the high molecular weight polymer to be used in formulating the binder system is governed primarily by the solubility or miscibility of the selected polymer in the molten wax solution and the gelling characteristics thereof as the wax is cooled. Secondary selection conditions include the extensional behavior of the polymer in the gel or working range of the binder, the effect of the polymer on the green strength of the molded part, and the mold release characteristics associated with the use of the polymer.

Each of these properties, including the gelling characteristics of the polymers in wax solution, may readily be determined by routine experiment. A dispersion of the candidate polymer in a suitable low-melting wax such as a synthetic octadecanol wax is prepared and the solubility or miscibility of the polymer in the wax is determined. The wax solution or dispersion is then cooled and the presence or absence of gelling is noted. Examples of polymers evaluated in this way which have demonstrated poor wax compatibility and/or non-gelling behavior include certain polyester copolymers, thermoplastic polyolefins, and thermoplastic polyurethanes.

The particularly preferred polymers for the formulation of thermoplastic binders in accordance with the present invention are the tri-block styrene-ethylene/butylene-styrene copolymers. These elastomeric copolymers, commercially available under the trade-name Kraton® from the Shell Chemical Company of Houston, Tex., form exceptionally strong gels in wax solution. Gelation of these polymers in wax solution is considered to be by association of the styrene endblocks, due to their thermodynamic incompatibility with the rubber midblock in the polymer.

As opposed, for example, to styrene di-block copolymers, these tri-block copolymers have an effective functionality greater than 2, and thus readily form the strong three-dimensional gel structure desired for good reforming and dewaxing behavior in accordance with the invention. The di-block styrene copolymer elastomers, on the other hand, are known to include polymer species demonstrating an inability to gel in wax-based binder systems.

Among the crystalline polymers exhibiting good gelling performance for thermoplastic binders, ultra-high molecular weight polymers are preferred. For hydrogen bonding polymers, polymer types comprising four or more reactive (hydrogen bond forming) functional groups per molecule are preferred.

As previously indicated, the binder formulation may include optional organic additives, polymeric or otherwise, which are effective to reinforce or strengthen the high molecular weight polymer gel. Particularly desirable are additives which can increase the gel breakdown temperature of the binder. For example, certain high glass transition temperature ($T_g$) polystyrene resins can be added to gels incorporating tri-block polystyrene copolymer elastomers to increase the $T_g$ of the styrene domains, and hence the breakdown temperature of these gels.

Hydrogen-bonded gels may also contain strengthening additives, strengthening in this case resulting from bridging between bonding sites on adjacent chains. Also in hydrogen bonded gels, ceramic fillers can play a significant role in gel formation; such gels are often much more pronounced and stable in the filled compounded batch than in the organic binder composition alone.

Modifying waxes may be particularly desirable additives in the gel binders of the invention, either to alter binder physical properties such as hardness, strength, or flexibility or to modify the flow or mold release characteristics of the binder system. Utilizing appropriate modifying waxes, binder formulations varying from extremely flexible at room temperature to hard and rigid at room temperature can be provided. In cases where particularly high flexibility is desired, a plasticizer may also be included in the binder formulation.

Carnauba wax is an example of a modifying wax useful to control the hardness of the binder, while oxidized polyethylene waxes offer improvements in mold release characteristics. Of course, other natural or synthetic waxes of similar character may additionally or alternatively be employed.

Added dispersants can have a substantial effect on the rheology of the binder and resulting ceramic batch. The use of appropriate dispersants allows for very high inorganic solids loadings in the ceramic batches, which loadings would be difficult to achieve without the use of any dispersants in the binder system. Thus, in adequately dispersed systems, powder loadings as high as 60–70% by volume are readily achieved, even in batches incorporating ceramic powders with average particle sizes in the one micron range.

Particularly in the case of batches for ceramic part forming, it is considered that residual carbon, remaining after the removal of binders from the batch material, is detrimental to the development of desirable ceramic microstructure in the final product. It is therefore important that all of the organic constituents of the binder have excellent burn-out properties, such that there will be minimal or no potential for forming carbon during the binder removal process. The binder formulations of the present invention, and especially the major wax and high molecular weight polymer components thereof, generally exhibit excellent burnout behavior.

Ceramic batches comprising thermoplastic gel binders in accordance with the invention may be compounded by simply combining the selected ceramic powder with a premixed binder in accordance with conventional procedures for using hot melt binders. However, the method preferred for thermoplastic batch preparation in accordance with the invention involves a preliminary powder processing step. In this step, the selected ceramic powders for the batch are first pre-milled with any desired dispersant and a solvent for the dispersant in a ball mill jar, to thoroughly coat the powder with the dispersant.

In a separate mixing step, the selected high molecular weight thermoplastic polymer or polymers are dissolved or dispersed in the wax components of the binder in a heated planetary mixer. The mixer is operated at a temperature above the melting temperature of the low melting waxes, and after the polymers have been dissolved or dispersed in these waxes other additives such as modifying waxes or the like are introduced and dissolved.

The particulate ceramic material and dispersant are then added to the molten wax/polymer mixture in the planetary mixer, and hot mixing is continued until complete blending of the ceramic and binder components, and subsequently complete volatilization of the solvent used for applying the dispersant to the ceramic powder, are achieved. If further mixing after solvent removal is desired, closed pressurized mixing equipment can be used to avoid the loss of the more volatile wax or other batch components.

Completion of the mixing process through solvent removal typically produces a thermoplastic paste exhibiting good fluidity or plasticity for molding or other forming process when heated and sufficient strength when cooled to allow for easy handling of the batch, or of a ceramic part or preform provided therefrom.

Final mixing of ceramic batches incorporating preferred thermoplastic gel binders such as hereinafter described is typically carried out at temperatures in the range of about 120°–180° C., with subsequent molding of the batch normally being carried out at a batch temperatures in the range of about 80°–180° C. Of course, higher or lower mixing or forming temperatures may be utilized for special applications.

As previously indicated, the forming of these batches may be carried out employing a number of different processes, including but not being limited to extrusion, injection molding, and vacuum forming. Injection molding is a particularly demanding process for ceramic part forming in terms of required batch and binder properties. The literature suggests that batch viscosities at the batch processing temperature should be below about 10,000 poises at shear rates in the range of 100–1000 sec$^{-1}$, these shear rates being typical for injection molding processes. Additionally, the binder must be formulated for easy release from the mold cavity once the part has been formed.

Table I below sets forth illustrative examples of ceramic batches comprising thermoplastic reversible gel binders in accordance with the invention which are particularly well suited for forming by injection molding processes. The ceramic powders selected for processing in Table I are zirconia ($ZrO_2$) powders, and the proportions of powders present are reported in parts by weight of the batch. Also reported in Table I are the components utilized in formulating the thermoplastic binders present in the batches, with the proportions of binder components also being reported in parts by weight. Finally, the identity and commercial source for some of the specific binder components are shown.

TABLE I

|  | 1 | 2 | 3 | 4 |
|---|---|---|---|---|
| Ceramic Powder (pbw) | | | | |
| Zircoa 5027 Zirconia | 1037 | 1037 | — | — |
| Zircoa A-grain Zirconia | — | — | 1066 | 1237 |
| Total Solids (pbw) | 1037 | 1037 | 1066 | 1237 |
| Binder Components (pbw) | | | | |
| $^a$styrene-ethylene/butylene-styrene tri-block copolymer | 28.9 | — | — | 35 |
| $^b$acid functional butyl methacrylate copolymer | — | — | 40 | — |
| $^c$ultra high molecular weight polyethylene | — | 3.9 | — | — |
| $^d$fatty alcohol wax 1 | 33.6 | 46.2 | 29 | 32 |
| $^e$fatty alcohol wax 2 | 22.1 | 30.0 | 19 | 21 |
| $^f$Carnauba wax | 11.9 | 16.4 | — | — |
| $^g$oxidized polyethylene wax 1 | — | — | 12 | — |
| $^h$oxidized polyethylene wax 2 | — | — | — | 12 |
| $^i$dispersant | 3.5 | 3.5 | 2.28 | 2.47 |
| Total Binder (pbw) | 104 | 80 | 102.28 | 102.47 |
| Volume % Solids | 67% | 67% | 68% | 66% |

| Components Key | |
|---|---|
| $^a$= Kraton ® G1650 elastomer | Shell Chemical Company |
| $^b$= Neocryl ® B723 copolymer | ICI Americas, Inc. |
| $^c$= HiFax ® 1900 polyethylene | Himont |
| $^d$= octadecanol wax | Conoco Inc. |
| $^e$= hexadecanol wax | Conoco Inc. |
| $^f$= Carnauba wax | Ross Chemical Co. |
| $^g$= AC-6702/AC-330 wax blend | Allied Corp. |
| $^h$= AC-656 wax | Allied Corp. |
| $^i$= Hypermer ® KD-3 dispersant | ICI Americas, Inc. |

Compositions 3 and 4 from Table I demonstrate the particularly preferred binder formulations for the injection molding of ceramic parts. These formulations exhibit viscosities well below the 10,000 poise level needed for good injection molding performance, and demonstrate excellent mold release behavior due to the inclusion of the optional oxidized polyethylene wax additives as mold release aids.

Additional formulations for ceramic batches provided in accordance with the invention are reported in Tables II and III below. The formulations in Tables II and III exhibit rheologies which are particularly well suited for extrusion processing. Moreover, the compositions in Table II provide exceptionally good extensional flow in the batch reforming region, such that they can provide extruded or otherwise processed green ceramic sheet which is highly amenable to thermoforming after extrusion.

Batch compositions in Tables II and III are reported in parts by weight, and except where otherwise noted the batch components employed are the commercially available materials set forth in the Components Key section of Table I above. The powdered glass utilized in the Table II formulation is a sodium aluminosilicate glass commercially available as Code 0317 glass from Corning Incorporated.

TABLE II

|  | 1 | 2 | 3 |
|---|---|---|---|
| Ceramic/Glass Powder (pbw) | | | |
| Zircoa 5027 Zirconia | 1359 | 1178 | — |
| Silicate Glass | — | — | 612 |
| Total Solids (pbw) | 1359 | 1178 | 612 |
| Binder Components (pbw) | | | |
| Kraton ® G1650 elastomer | 30 | — | 30 |
| Neocryl ® B723 polymer | — | 30 | — |
| octadecanol wax | 35 | 32 | 35 |
| hexadecanol wax | 22.65 | 20 | 22.65 |
| Carnauba wax | 12.35 | 18 | 12.35 |
| Hypermer ® KD-3 dispersant | 8.75 | 7.66 | — |
| $^j$Dispersant 2 | — | — | 2.0 |
| Total Binder (pbw) | 108.75 | 107.66 | 102 |
| Volume % Solids | 68% | 66% | 68% |

$^j$= Emphos ™ PS-21A surfactant, Witco Chemical Corp.

TABLE III

|  | 1 | 2 |
|---|---|---|
| Ceramic Powder (pbw) | | |
| Zircoa 5027 Zirconia | 1005 | 1037 |
| Total Solids (pbw) | 1005 | 1037 |
| Binder Components (pbw) | | |
| ᵏethylene/acrylic acid copolymer | 20 | — |
| Kraton ® G1650 elastomer | — | 35 |
| Octadecanol wax | 40.01 | 32 |
| Hexadecanol wax | 25.88 | 21 |
| Carnauba wax | 14.11 | 12 |
| Hypermer ® KD-3 dispersant | 7.65 | 3.5 |
| Total Binder (pbw) | 107.65 | 104 |
| Volume % Solids | 61% | 67% |

ᵏ= Primacor ® 3340 acrylic acid copolymer, Dow Chemical Co.

As will readily be apparent to those skilled in the art, the slump resistance exhibited by a shaped ceramic or other green powder preform during the course of the dewaxing (debindering) procedure is critical to the commercial success of the manufacturing process. The principal challenge in formulating thermoplastic binders for ceramic powders is to simultaneously provide low forming viscosities and high dewaxing slump resistance in a single batch formulation.

Many currently wax-based thermoplastic binders overcome this dilemma by using multi-phase binder systems in which one phase can be solvent-extracted prior to the high-temperature dewaxing step. Other approaches have involved multi-phase wax binders wherein the early volatilization of a low-melting wax phase develops enhanced slump resistance for subsequent high-temperature debindering.

In the binders of the present invention, the retention of the three-dimensional gel structure through the preliminary stages of low-melting wax volatilization generally provides excellent resistance to slumping during the dewaxing cycle. Gel retention is achieved by heating green ceramic parts of the desired configuration to a temperature in a range somewhat above the melting point of the most volatile wax employed in the binder, but below the thermal breakdown temperature of the gel. Heating in this temperature is generally continued for a time sufficient to achieve a level of wax volatilization such that the green shape becomes highly resistant to slumping when heated above the gel breakdown temperature of the binder.

The heating time and proportion of wax removal required to reach this state will vary depending upon the configuration of the part and the precise binder formulation utilized in the batch, but can readily be determined by routine experiment. If accelerated wax volatilization is necessary or desired, vacuum heating systems can be employed to shorten the time needed for preliminary wax vaporization.

Preferred dewaxing procedures for ceramic parts formed from the batch formulations of Tables I–III above generally comprise at least the following stages: (a) slow heating (e.g., 15° C. per hour or less) to the lower limit of the low-melting wax volatilization range (about 110° C.), (b) slow heating or long dwell periods in the temperature range of relatively rapid low-melting wax volatilization (e.g., 4–20 hours at temperatures in the range of about 110°–165° C.), and (c) relatively slow heating or long dwell periods at temperatures in the upper temperature range for dewaxing (e.g., 10–40 hours at temperatures in the range of about 165°–230° C.).

The use of thermoplastic binder formulations as herein described has particular advantages for metal powder forming, since conventional aqueous binder systems can show considerable incompatibility with many metals. However, while the thermoplastic binders particularly preferred for ceramic powder batches can, if necessary, be used without modification for the preparation of metal powder batches, such batches will not generally exhibit properties optimum for metal powder forming applications such as the extrusion of green metal powder preforms.

Instead, such batches are restricted as to metal powder loading and show somewhat limited preform green strength and resistance to post-extrusion slumping, especially in extrudate of complex shape. In particular, the formulations with metal powder can become very weak, exhibiting low melt strength and loss of elongational flow characteristics. These results are presently attributed to metal powder/polymer interactions affecting the gelling characteristics of the batches, as well as to the somewhat narrow particle size distributions of commercially available metal powders which limit particle packing.

We have found that excellent powder batch forming characteristics in metal powder systems can be achieved using our thermoplastic binder systems if the amounts of acid functional low molecular weight polymers in the formulations are increased. Further advantages are realized by increasing metal particle packing density in the batch through a proper balance of fine and coarse metal particle sizes therein.

Acid functional polymers found particularly beneficial to the extrusion processing of metal powders are copolymers between a polyolefin monomer and acrylic or methacrylic acid. Examples of such copolymers include ethylene/methacrylic acid copolymers and ethylene/acrylic acid copolymers. Acid functionalities should generally be between 5 and 20% and molecular weights between 1,000 and 25,000. The melt indices of the copolymers employed are generally between 50 and 600.

In formulating the optimum binders for these powders, the acid-functional copolymers should comprise between 20 and 50% of the total organic content of the binder formulation. The most desirable binders will comprise a combination of these acid functional copolymers with styrene tri-block elastomeric copolymers, as utilized above in the preferred ceramic powder forming binders.

The acid functional polymers described serve as particle dispersants by aiding in the deflocculation the metal powders added to the batch. The result is a significant increase in the metal powder loadings which are possible, and an increase in both green and melt strength. Elongational flow characteristics are also recovered in some degree.

In some cases the acid functional polymers are considered to be active promoters of reversible gelling in these systems, via polymer\polymer hydrogen bonding in the batch. In addition, particular acid functional polymers can exhibit gradual gelation which is irreversible. This greatly enhances slump resistance during binder removal.

An additional useful binder component for metal powder forming, particularly where the preferred combination of acid functional and elastomer copolymers is used, is an endblock modifier for the elastomer copolymer. These modifiers associate with the elastomer endblock domains, strengthening the structure of the reversible gel. A number of such modifiers are known, these typically consisting of polystyrene polymers. A specific example of such a polymer is Endex 160 polymer, a high $T_g$ polystyrene polymer, commercially available from Hercules Inc. of Wilmington, Del.

Particularly preferred thermoplastic organic binder compositions for metal powder extrusions, then, will comprise, in parts by weight, about 25–50 parts of low-melting volatile waxes, 20–50 parts of acid functional copolymers, 0–35 parts (preferably 20–35 parts) of styrene triblock copolymers, 0–20 parts of endblock modifiers, and 2–10 parts of particle dispersants. The triblock copolymers permit high flow during extrusion and low flow during debindering, via reversible gelling of the binder, while the endblock modifiers reinforce batch resistance to reflow and the acid functional ethylene copolymers enhance the dispersion of the metal particles and provide acceptable extrusion quality. The particle dispersants are nevertheless still essential in these formulations in order to obtain high powder loading levels in the moldable powder batch.

In formulating thermoplastic powder batches using these binders, we generally include in the batch, in parts by weight, about 5–20 parts of thermoplastic binder and 80–95 parts metal powder (typically 30–45% by volume and 55–70% by volume, respectively). For best particle packing in the batch, we use a metal particle size distribution comprising 60–80 volume percent coarse particles and 20–40 volume percent fine particles, the fine/coarse particle size ratio most preferably being at least about 7:1. With this distribution the fine particles effectively fill the void spaces between the larger particles, leading to increased green density in the preformed parts.

The low melting point, volatile waxes used for metal powder extrusions may again be selected from among the fatty alcohol, fatty acid, fatty glycol, and fatty glyceride waxes. Further, the dispersants used may be the same as for the ceramic powder batches, and the copolymer elastomers are most preferably the triblock styrene-ethylene/butylene-styrene elastomers.

Metal powder batches such as described may be conveniently compounded by blending the waxes, polymers and dispersant at a temperature above the melt temperature of the mix, using for example a double planetary type mixer. Thereafter, the metal powder is dispersed directly into the hot organic mixture, with continued mixing until a homogeneous thermoplastic powder batch is obtained. Thereafter, the batch is removed, cooled, and granulated if desired for convenient later extrusion.

Extrusion of these powder batches can readily provide complex preforms such as cellular honeycomb structures. Upon cooling these preforms have sufficient green strength for easy handling, and they can be efficiently debindered and fired to provide porous or non-porous metal cellular products which are essentially free of consolidation-induced shape distortion.

Illustrative examples of thermoplastic metal powder batches formulated as above described include the following batches compounded using iron aluminide and titanium aluminide metal powders. The fine particle component of these batches consisted of iron carbonyl powder (<6 microns) or titanium hydride powder, the fines typically comprising about 28 volume percent of the metal powder component of the batches.

TABLE IV

|  | 1-M | 2-M | 3-M |
| --- | --- | --- | --- |
| Metal Powder (pbw) |  |  |  |
| [a]Fe carbonyl powder | 738.21 | 655.2 | — |
| [b]Fe:Al powder (−325 mesh) | 628.84 | 558.14 | — |
| [c]Ti—Al powder (−100 mesh) | — | — | 284.8 |
| [d]Ti—$H_2$ powder |  |  | 362.4 |
| Binder Components (pbw) |  |  |  |
| [e]styrene-ethylene/butylene-styrene triblock copolymer | — | 35 | 35 |
| [f]endblock modifier | — | 10 | 10 |
| [g]acid-functional ethylene/methacrylic acid copolymer | 50 | — | 20 |
| [h]acid-functional ethylene/methacrylic acid copolymer | — | 20 | — |
| [i]octadecanol wax | 15 | 25 | 25 |
| [j]hexadecanol wax | 35 | 10 | 10 |
| [k]particle dispersant | 4.37 | 2.59 | 5.12 |
| Batch Properties |  |  |  |
| Volume % Solids | 67% | 65% | 59% |
| Theoretical batch density (g/cc) | 4.1 | 4.01 | 2.63 |
| Inorganic/organic weight ratio | 13.1 | 11.83 | 6.16 |

| Components Key | |
| --- | --- |
| Batch Component | Manufacturer |
| [a]= BASF OM Carbonyl Fe powder | BASF |
| [b]= Alloy 50:50 Fe:Al powder, −325 mesh | Shield |
| [c]= Shield Alloy Ti—Al powder, −100 mesh | Shield |
| [d]= Powell Metal Ti—$H_2$ powder | Powell |
| [e]= Kraton® G1650 copolymer elastomer | Shell Chemical Company |
| [f]= Endex™ 160 polymer | Hercules |
| [g]= Nucrel™ 699 copolymer | Du Pont |
| [h]= Nucrel™ 599 copolymer | Du Pont |
| [i]= octadecanol wax | Conoco Inc. |
| [j]= hexadecanol wax | Conoco Inc. |
| [k]= Hypermer™ KD-3 dispersant | ICI Americas, Inc. |

The metal powder loadings achieved in the illustrative powder batch compositions of Table IV above were substantially higher than the 55% volume loadings typically achievable using elastomer copolymers as the sole thermoplastic component in the binder system. Nevertheless the batches had lower viscosity and better extrusion characteristics.

The powder batches shown in Table IV were formed into preforms by twin-screw extrusion at temperatures above the gel breakdown temperatures of the batches. Extrusion was though a perforated mixing plate, 20 mesh screens, and an appropriate extrusion die to provide high-cell-density extruded honeycombs.

The iron aluminide batches were extruded into 1.5-inch-diameter, square-channeled, monolithic honeycomb preforms having 6 mil channel wall thicknesses and 400 channels per square inch of frontal surface area. Batch 1-M required slightly lower extrusion pressure and showed slightly better extrusion quality than batch 2-M. However, the latter batch was more resistant to extrudate slumping, exhibiting faster gel formation on cooling and a higher green/melt strength. Thus the preform from this batch set more rapidly after extrusion and was easier to handle.

Both batches demonstrated good interparticle packing and had good sintering characteristics, with low shrinkage and a very narrow pore size distribution after debindering and firing. No evidence of significant debindering defects or reflow during debindering or sintering was observed.

The titanium aluminide batch (3-M) was easily extruded into a 1-inch diameter, square-channeled, monolithic honeycomb preform with 25 mil channel walls and 100 channels per square inch of open frontal area. Even though the particle size distribution had not been optimized in this system, good retention of extrudate shape, adequate green strength, and acceptable debindering and firing behavior were observed. Thus good sintered properties with acceptable porosity, pore size, pore size distribution, and oxidation resistance were obtained.

Based on these results it appears that acid functionality in the polymer binder is very beneficial in obtaining a well-dispersed metal powder system capable of high powder volume loadings with acceptable rheology for good extrusion quality. Further, the inclusion of a triblock elastomer component significantly improves slump resistance, such that a blend of the two systems is most beneficial for producing a quality extruded product which can resist distortion during debindering.

While the invention places principal reliance on the polymer gel structure to provide the slump resistance required for efficient dewaxing, practical considerations relating to the need for rapid dewaxing may in some cases dictate that the rheological characteristics of the batch will play a significant supporting role. For example, commercial expedience may sometimes require that the gel breakdown temperature of the binder be exceeded while there is still considerable wax contained in the green ceramic body.

Under this condition it is desirable that the batch exhibit rheological characteristics which include a yield stress and/or pseudoplastic behavior. Advantageously, the gel-forming polymers employed in the present invention have been found to impart a high degree of pseudoplasticity to the batch, and many of the hydrogen-bonded polymers provide batches exhibiting good yield. These features, although perhaps of secondary importance for many manufacturing operations, may still impart a significant advantage in selected binder formulations for specialized commercial processes.

While the invention has been particularly described above with respect to specific materials and specific procedures, it will be recognized that those materials and procedures are presented for purposes of illustration only and are not intended to be limiting. Thus numerous modifications and variations upon the compositions, processes and apparatus specifically described herein may be resorted to by those skilled in the art within the scope of the appended claims.

We claim:

1. A binder composition consisting essentially, in weight percent, of about 30–80% of a low-melting wax selected from the group consisting of fatty alcohols, fatty acids, fatty glycols, fatty glycerides, and esters thereof having a melting temperature not exceeding about 80° C., 1–40% of at least one high molecular weight organic polymer selected from the group consisting of ultrahigh molecular weight polyethylene, polyethylene/acrylic acid copolymers, butyl methacrylate/acrylic acid copolymers, and styrene tri-block copolymers which is miscible with the low-melting wax and forms a reversible gel therein, 0–20% total of modifying waxes, and 0–15% total of functional binder additives selected from the group consisting of particle dispersants, lubricants, and mold release agents.

2. A moldable thermoplastic powder batch comprising a powder component and a binder component, the powder component consisting of a sinterable inorganic particulate material and a binder component consisting of a thermoplastic organic binder composition, wherein:

the binder composition comprises an organic polymer dissolved or dispersed in a wax, the wax comprises a low-melting wax selected from the group consisting of fatty alcohols, fatty acids, fatty glycols, fatty glycerides, and esters thereof which are crystalline solids at room temperature, the organic polymer is a polymer selected from the group consisting of ultrahigh molecular weight polyethylene, polyethylene/acrylic acid copolymers, butyl methacrylate/acrylic acid copolymer, and styrene tri-block copolymers, and the polymer forms a reversible gel in the wax.

3. A moldable thermoplastic powder batch in accordance with claim 2 which is a thermoplastic ceramic powder batch, and wherein the sinterable inorganic particulate material is a powdered ceramic material.

4. A moldable thermoplastic ceramic batch in accordance with claim 3 which comprises about 40–75% by volume of the powdered ceramic and the remainder thermoplastic organic binder.

5. A moldable thermoplastic ceramic batch in accordance with claim 4 wherein the wax is a low-melting wax having a melting temperature not exceeding about 80° C.

6. A moldable thermoplastic ceramic batch in accordance with claim 5 wherein the low-melting wax is a wax comprising molecules of 14–20 carbon atoms and exhibiting substantial volatilization at a temperature below 140° C.

7. A moldable thermoplastic ceramic batch in accordance with claim 6 wherein the organic polymer is an elastomeric styrene tri-block copolymer comprising styrene endblocks and an ethylene/butylene midblock.

8. A moldable thermoplastic powder batch in accordance with claim 2 wherein the sinterable inorganic particulate material is a powdered metal, and wherein the thermoplastic organic binder composition includes at least one acid functional polymer.

9. A moldable thermoplastic powder batch in accordance with claim 8 wherein the acid functional polymer is a copolymer of a polyolefin monomer and acrylic or methacrylic acid, and wherein the copolymer comprises 20–50% of the binder composition.

10. A moldable thermoplastic powder batch in accordance with claim 9 wherein the thermoplastic organic binder composition comprises a combination of the acid functional copolymer and an elastomer.

11. A moldable thermoplastic powder batch in accordance with claim 10 wherein the thermoplastic organic binder composition further comprises an endblock modifier for the elastomer copolymer.

12. A moldable thermoplastic powder batch in accordance with claim 8 which comprises, in parts by weight, about 5–20 parts of thermoplastic binder and 80–95 parts of metal powder.

13. A moldable thermoplastic powder batch in accordance with claim 8 wherein the thermoplastic organic binder composition comprises, in parts by weight, about 25–50 parts of low-melting volatile waxes, 20–50 parts of acid functional copolymers, 0–35 parts of styrene triblock copolymers, 0–20 parts of endblock modifiers, and 2–10 parts of particle dispersants.

14. A moldable thermoplastic ceramic batch comprising a ceramic component consisting of a particulate ceramic and a binder component consisting of a thermoplastic organic binder composition, wherein the binder composition consists essentially, in weight percent, of about 30–80% of a low-melting wax selected from the group consisting of fatty alcohols, fatty acids, fatty glycols, fatty glycerides, and esters thereof and having a melting temperature not exceeding about 80° C., 1–40% of at least one high molecular weight organic polymer selected from the group consisting of ultrahigh molecular weight polyethylene, polyethylene/acrylic acid copolymers, butyl methacrylate/acrylic acid copolymers, and styrene tri-block copolymers which is soluble in the low-melting wax and forms a reversible gel therein, 0–20% total of modifying waxes, and 0–15% total of functional binder additives selected from the group consisting of particle dispersants, lubricants, and mold release agents.

15. A moldable thermoplastic ceramic batch in accordance with claim 14 wherein the high molecular weight organic polymer is an elastomeric styrene-ethylene/butylene-styrene tri-block copolymer.

16. A moldable thermoplastic ceramic batch in accordance with claim 15 wherein the high molecular weight organic polymer is an acid functional butyl methacrylate copolymer.

* * * * *